Patented Jan. 27, 1953

2,626,934

UNITED STATES PATENT OFFICE 2,626,934

ALKALINE-SETTING RESIN ADHESIVE AND METHOD OF MAKING SAME

Carl C. Kesler, Cedar Rapids, Iowa, assignor to Penick & Ford, Ltd., Incorporated, Cedar Rapids, Iowa, a corporation of Delaware No Drawing. Application November 17, 1948, Serial No. 60,641

20 Claims. (Cl. 260—9)

This invention relates to an alkaline-setting resin adhesive and to the method of making the same. More particularly, the invention relates to a starch- or dextrin-resin adhesive capable of forming water-resistant films when dried under alkaline conditions and to the process for making the same.

Amylaceous adhesives have long been used because of their ability to act as a cementing material between a wide variety of surfaces. At present they find a large application, especially in the paper and textile industries, as an adhesive medium for cementing cellulose fibers to cellulose fibers and as a binder for cementing clay particles to cellulose fibers. Although the films of these amylaceous adhesives have a high tensile strength and consequent high binding power when dry, when wet they rapidly absorb moisture, lose their strength and become quite ineffective as a cementing agent.

Many methods have been proposed and some have achieved considerable acceptance for retarding or eliminating this tendency of starch films to rehydrate and soften on exposure to water with consequent loss of strength. Probably the most widely used method to date has been the incorporation in the adhesive of from ten to thirty per cent of a so-called acid-setting resin which may be one of large number of available urea-formaldehyde or melamine-formaldehyde compounds. Under the right conditions of temperature and acidity, these resins combine with the starch in such a way that the resulting "cured" films are relatively resistant to the above-mentioned rehydration on exposure to water and consequently maintain a degree of "wet-strength" or adhesive effectiveness when wet. It has been proposed that the above-mentioned resins reduce the rehydration ability of the starch films either because the necessary conditions of curing cause a degree of "cross-linking" between the starch and resin molecules which causes the "set" film to resist swelling by water, or because the resin molecules combine with the starch molecules in such a way as to "block-off" the portions of the starch molecule susceptible to combination or rehydration with water. Either or both of the mechanisms appear possible.

One of the principal objections to the use of the acid-setting resins in amylaceous adhesives is that the acidity necessary for insolubilization prevents the development of many characteristics desirable or necessary in adhesives and which cannot be obtained with starches except in an alkaline condition. It has long been an accepted practice to improve the tack or adhesiveness, string or cohesiveness, body or viscosity, rate of setting, etc., of starch adhesives by the addition of various alkaline additives as caustic soda or soda ash and adhesives suitable for many purposes could not be prepared without such additions. It is obvious that the acidity necessary for the use of the acid-setting resins prevented the development of many desirable paste characteristics and seriously limited the use of such adhesives to those applications requiring relatively low performance characteristics. Further, the amount of the resin can be greatly reduced in quantity when an alkaline-setting resin is employed to insolubilize starch films instead of an acid-setting resin.

There has long been a need for resin-amylaceous adhesives in which a set could be effected in the alkaline range. There are many respects in which such an alkaline-setting product would be superior to the acid-setting resin-starch product. For example, it has been found desirable to incorporate in some adhesives a proportion of uncooked or ungelatinized starch intended to be cooked in situ after application. The inclusion of an alkaline material in such an adhesive has the effect of materially reducing the temperature necessary for the gelatinization of the uncooked starch portion, and consequently considerably improves the speed and efficiency of such an application. Such an improvement is impossible when an acid-setting resin is used.

An object of the invention is to prepare a starch- or dextrin-resin adhesive which develops water-resistant films when dried under alkaline conditions. Another object is to prepare potentially water-resistant starch- or dextrin-adhesives having the desirable tack, body, rapid rate of bonding, etc., possible with starch adhesives only through the concurrent use of alkaline additives. A further object is to prepare potentially water-resistant adhesives containing a proportion of ungelatinized starch intended to be cooked in situ after the application of the adhesive, the gelatinization temperature of the uncooked portion being appreciably lowered by the inclusion of the alkaline material. Yet another object is to provide a potentially water-resistant adhesive having substantially non-corrosive properties as regards the equipment used for the application thereof and as regards metal objects, containers, etc., which might come in contact with paper boxes, etc., on which the adhesive is applied during fabrication. A further object is to provide a potentially water-resistant adhesive which, while containing a proportion of formaldehyde, may be applied and used without a noticeable formaldehyde odor, either during its preparation and application or in the finished product in which it is used as an adhesive. Yet another object is to provide a potentially water-resistant adhesive, the films of which have substantially permanent water-resistant properties and which are also resistant to fungus attack. Yet another object is to provide a process and adhesive product of new characteristics and having the advantages set out more fully hereinafter.

Many attempts have been made to incorporate in amylaceous adhesives, resins capable of setting or hardening in an alkaline condition in order to produce a water-resistant film while at the same time maintaining the desirable characteristics of an alkaline adhesive. Until the present invention, such attempts have been unsuccessful, and while a product of this character would have found immediate acceptance and wide use, none has appeared upon the market.

I have discovered that by employing a resin capable of setting or hardening in an alkaline condition and by adding thereto sufficient alkaline materials to bring the pH somewhat higher than is necessary to set or harden the resin alone, that an extremely satisfactory product is obtained. Further it is found that a variety of resins can be effectively used to so insolubilize the starch films providing the pH is sufficiently high. Resins which will set or harden at a pH above 7 may be employed, care being taken to raise the pH so that in the final drying operation the pH will be above the pH at which the resin would harden if employed alone. Particularly useful are the ketone-aldehyde resins, the phenol-aldehyde resins, and the resorcinol-aldehyde resins.

In general, the factors of concentration, pH, type and modification of resin, drying temperature, etc., affect the cure of the starch or dextrin resin film much as they affect the cure of the same resin alone and a proper balancing of conditions is necessary to achieve the most satisfactory result. As, for example, increasing the temperature of cure will permit a lowering of pH while still attaining satisfactory insolubilization. Likewise, as with the resins alone, minor proportions of different resins or other catalytic agents may be added to modify the setting rate or otherwise modify the properties of the adhesive mixture. For this purpose, a small amount of resorcinol-formaldehyde resin may be desirable to hasten the cure of certain acetone-formaldehyde resin-starch or resin-dextrin combinations.

As with all resin-containing adhesives, it is essential that these adhesives have a certain minimum glue life during which the viscosity and other properties remain in a range suitable for satisfactory application, etc. Such a consideration will, of course, become a factor in the selection of the most desirable combination of conditions as noted above for the final insolubilization of the films. Because of the effects of the several variables noted on the starch- or dextrin-alkaline resin reaction and their close inter-relationship, considerable latitude must be allowed in setting out directions for the process and the preparation of the product. In each case, however, the necessary pH or degree of alkalinity must be somewhat higher than that necessary to harden the resin alone. As an illustration, a catalyzed phenol-formaldehyde resin which will harden alone at a pH of 7–8 at a given temperature will satisfactorily insolubilize a starch film at the same temperature only if the pH of the paste is at least 9, while an acetone-formaldehyde resin which hardens alone at a pH of 8–9 can be satisfactorily used in a starch paste at pH's of 10.5 or above.

The following specific examples may be set out and will illustrate some of the variations in the conditions necessary for the insolubilization of alkaline-setting resin-starch or resin-dextrin films:

Example 1

A corrugated board adhesive illustrating the new invention was prepared as follows:

100 lbs. unmodified starch, cooked in
200 gals. water. Add
20 lbs. caustic soda (7% solution) and
23 lbs. borax. Then add
600 lbs. unmodified, uncooked starch suspended in
150 gals. water. Add
35 lbs. acetone-formaldehyde resin (Bakelite Corp. BR–16648)

After application of the above adhesive, the board was heated in the customary corrugating board equipment which caused the gelatinization in situ of the raw starch portion and caused the formation of a water-resistant starch-resin glue line. After water immersion for 24 hours, a sample of board so prepared showed a glue line still intact and with sufficient strength to pull the cellulose fibers from the paper surfaces when the plies of the wet board were forced apart. In contrast, a similar board prepared without the resin in the adhesive separated easily and completely after but a few minutes' soaking.

Example 2

Another adhesive mixture was prepared by combining the following:

100 lbs. white dextrine
10 lbs. phenol-formaldehyde resin (Plyophen No. 6000, Reichold Chem. Corp.)
200 lbs. water
2 lbs. catalyst (Plyophen 6002, a formaldehyde containing substance)
2 lbs. caustic soda or enough to give a pH between 9 and 11

The above was cooked in the usual manner for the preparation of paper bag adhesives or adhesives for shipping containers, etc. The caustic was added in sufficient amount to bring the pH in the range necessary to bring about a reaction between the starch and resin. The resin may be added at the time of hydration of dextrin or subsequently with the catalyst.

Example 3

Another adhesive was prepared by combining the following ingredients:

275 lbs. starch-dextrin blend
5.5 lbs. resorcinol-formaldehyde resin (QC–123 Bakelite Corporation)
725 lbs. water
5.5 lbs. catalyst (containing formaldehyde)
1.5 lbs. caustic soda The amount of caustic may be varied to give the desired pH. This should be in the range of 9 to 11 in order to bring about the reaction. The character of the water used and the acidity of the carbohydrate will cause the amount of caustic to be varied with different samples. The order of addition may be the same as in Example 2.

The water-resistant films incorporating the alkaline-setting resins are relatively stable and do not lose strength on exposure to high humidities as do many of the acid-setting resin-starch combinations. They are not susceptible to fungus or mold growths as are the acid-setting resin-starch adhesives. They do not give off the objectionable formaldehyde odor during use as is so evident with many acid-setting resin-starch adhesives. The alkaline adhesives are relatively non-corrosive to the application equipment, much of which is manufactured to close mechanical tolerances and with highly-polished surfaces. Similarly, in contrast to the action of acidic adhesives, they are non-corrosive to the contents (metal cans, etc.) of boxes in which the alkaline resin adhesive has been used during fabrication. As little as from 2 to 5% (on a starch or dextrin basis) of the alkaline-setting resin will satisfactorily insolubilize starch films, as contrasted with 10 to 30% ordinarily required for acid-setting resins. This affords a considerable economic advantage.

As with other amylaceous adhesives, the products of this invention may be used with clays or other mineral fillers as well as fibrous, textile or other cellulose materials. They are thus applicable to a wide variety of uses, including all types of adhesives, coatings, sizings, etc.

While in the foregoing specification, I have set forth specific examples and embodiments of the invention in considerable detail for the purpose of illustrating the invention, it will be understood that such details may be varied widely by those skilled in the art without departing from the spirit of my invention.

I claim:

1. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a water-soluble resin capable of setting to a water-resistant state at a pH within the range 7.0 to 9.0, said resin being selected from the group consisting of phenol-aldehyde, ketone-aldehyde, and resorcinol-aldehyde resins, adding sufficient alkali to bring the pH of the mixture to within the range of 9.0 to 11.0, and raising the temperature of said mixture above the temperature required to gelatinize said material.

2. In a process of preparing starch adhesives capable of forming water-resistant films on drying, the steps of forming in water a mixture of starch with from 2 to 10% by weight on the basis of the total amount of said starch of a water soluble resin capable of setting to a water-resistant state at a pH within the range 7.0 to 9.0, said resin being selected from the group consisting of phenol-aldehyde, ketone-aldehyde, and resorcinol-aldehyde resins, adding sufficient alkali to bring the pH of the mixture to within the range of 9.0 to 11.0, and raising the temperature of said mixture above the temperature required to gelatinize said starch.

3. In a process of preparing dextrin adhesives capable of forming water-resistant films on drying, the steps of forming in water a mixture of dextrin with from 2 to 10% by weight on the basis of the total amount of said dextrin of a water soluble resin capable of setting to a water-resistant state at a pH within the range 7.0 to 9.0, said resin being selected from the group consisting of phenol-aldehyde, ketone-aldehyde, and resorcinol-aldehyde resins, adding sufficient alkali to bring the pH of the mixture to within the range of 9.0 to 11.0, and raising the temperature of said mixture above the temperature required to gelatinize said dextrin.

4. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a ketone-aldehyde resin capable of setting to a water-resistant state at a pH within the range 8.0 to 9.0, adding sufficient alkali to bring the pH of the mixture to within the range of 9.0 to 11.0, and raising the temperature of said mixture above the temperature required to gelatinize said material.

5. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a phenol-aldehyde resin capable of setting to a water-resistant state at a pH within the range 7.0 to 8.0, adding sufficient alkali to bring the pH of the mixture to within the range of 9.0 to 11.0, and raising the temperature of said mixture above the temperature required to gelatinize said material.

6. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a resorcinol-aldehyde resin capable of setting to a water-resistant state at a pH within the range 7.0 to 9.0, adding sufficient alkali to bring the pH of the mixture to within the range of 9.0 to 11.0, and raising the temperature of said mixture above the temperature required to gelatinize said material.

7. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of an acetone-formaldehyde resin capable of setting to a water-resistant state at a pH within the range 8.9 to 9.0, adding sufficient alkali to bring the pH of the mixture to within the range of 9.0 to 11.0, and raising the temperature of said mixture above the temperature required to gelatinize said material.

8. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a resorcinol-formaldehyde resin capable of setting to a water-resistant state at a pH within the range 7.0 to 9.0, adding sufficient alkali to bring the pH of the mixture to within the range of 9.0 to 11.0, and raising the temperature of said mixture above the temperature required to gelatinize said material.

9. An adhesive prepared in accordance with the steps outlined in claim 1.

10. An adhesive prepared in accordance with the steps outlined in claim 2.

11. An adhesive prepared in accordance with the steps outlined in claim 3.

12. An adhesive prepared in accordance with the steps outlined in claim 4.

13. An adhesive prepared in accordance with the steps outlined in claim 5.

14. An adhesive prepared in accordance with the steps outlined in claim 6.

15. An adhesive prepared in accordance with the steps outlined in claim 7.

16. An adhesive prepared in accordance with the steps outlined in claim 8.

17. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a water-soluble resin capable of setting to a water-resistant state at a pH within the range 7.0 to 9.0, said resin being selected from the group consisting of phenol-aldehyde, ketone-aldehyde, and resorcinol-aldehyde resins, adding sufficient alkali to bring the pH of the mixture substantially above pH 9 and thereby within the alkaline range for reaction between said material and said resin, and raising the temperature of said mixture above the temperature required to gelatinize said material.

18. An adhesive prepared in accordance with the steps outlined in claim 17.

19. In a process of preparing starch and dextrin adhesives capable of forming water-resistant films on drying, the steps of forming in water a mixture of a material selected from a group consisting of starch, dextrin, and mixtures of starch and dextrin, with from 2 to 10% by weight on the basis of the total amount of said material of a water-soluble resin capable of setting to a water-resistant state at a pH within the range 7.0 to 9.0, said resin being selected from the group consisting of phenol-aldehyde, ketone-aldehyde, and resorcinol-aldehyde resins, adding sufficient alkali to bring the pH of the mixture to at least one full point on the pH scale above the lowest alkaline pH at which said resin can be made to set under conditions otherwise the same, and raising the temperature of said mixture above the temperature required to gelatinize said material.

20. An adhesive prepared in accordance with the steps outlined in claim 19.

CARL C. KESLER.

REFERENCES CITED

The following references are of record in the file of this patent:

UNITED STATES PATENTS

| Number | Name | Date |
|---|---|---|
| 1,959,433 | Loetscher | May 22, 1934 |
| 2,068,759 | Nevin | Jan. 26, 1937 |
| 2,197,357 | Widmer et al. | Apr. 16, 1940 |
| 2,318,560 | Ripper | May 4, 1943 |
| 2,322,887 | Schwartz et al. | June 29, 1943 |
| 2,362,086 | Myers | Nov. 7, 1944 |
| 2,398,307 | Hessel et al. | Apr. 9, 1946 |
| 2,414,415 | Rhodes | Jan. 14, 1947 |
| 2,463,148 | Caeser et al. | Mar. 1, 1949 |
| 2,486,399 | Gagarine | Nov. 1, 1949 |
| 2,489,170 | Wooster et al. | Nov. 22, 1949 |
| 2,554,454 | Casebolt | May 22, 1951 |